July 1, 1930.                H. GUETTINGER                1,768,979
              MOTIVE SYSTEM FOR DIRECT CURRENT REGULATORS
                          Filed Dec. 1, 1928
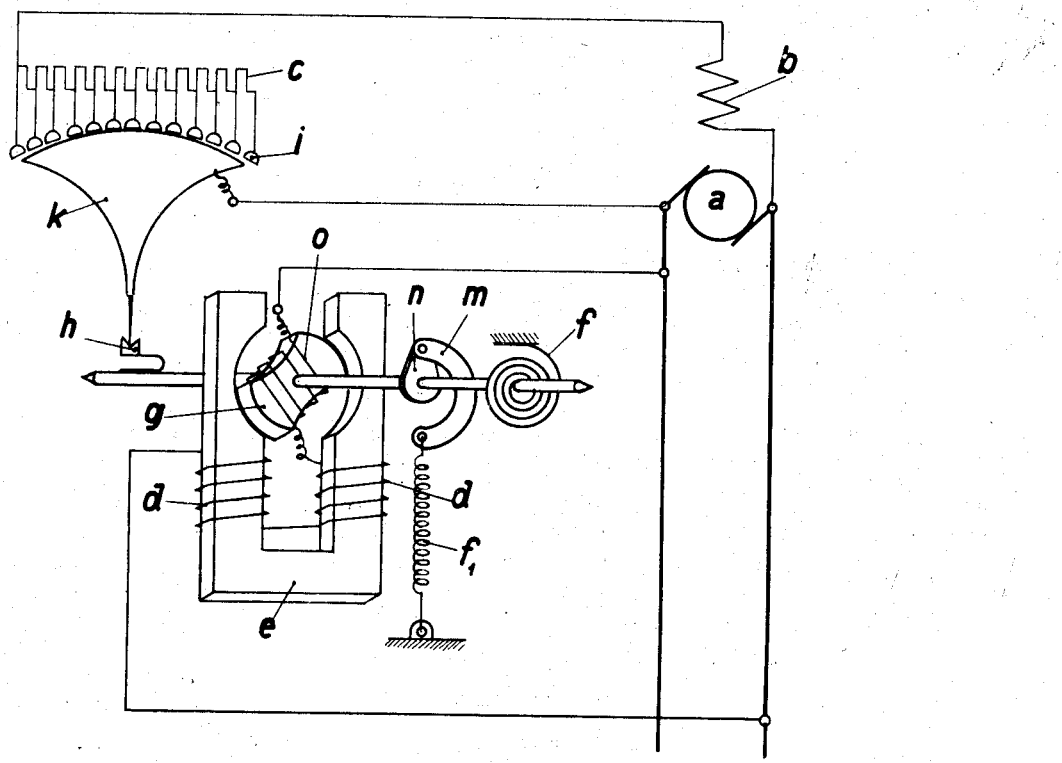
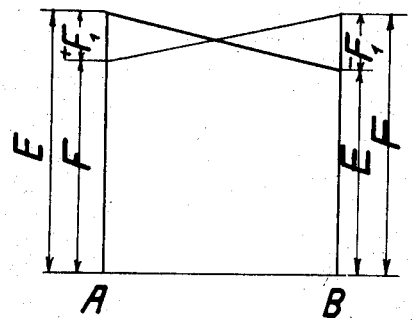
Inventor
Heinrich Guettinger.
By Alfred N. Dyson
    Attorney.

Patented July 1, 1930

1,768,979

UNITED STATES PATENT OFFICE

HEINRICH GUETTINGER, OF WETTINGEN, SWITZERLAND, ASSIGNOR TO A. G. BROWN BOVERI & CIE., OF BADEN, SWITZERLAND, A JOINT-STOCK COMPANY OF SWITZERLAND

MOTIVE SYSTEM FOR DIRECT-CURRENT REGULATORS

Application filed December 1, 1928, Serial No. 323,137, and in Germany December 1, 1927.

The invention deals with the motive system for direct current regulators which regulators possess a wound armature which armature opposed by the torque of a spring turns or swings between the poles of an excited field. Systems of this type have the disadvantage that the torque decreases with the increased angle of turn of the armature due to the varying amount of pole surface covered.

According to the invention this disadvantage is overcome by means of an auxiliary spring.

A regulator in combination with a machine to be regulated is shown as an example of the invention in Fig. 1. Fig. 2 is a diagram representing the torque exerted on the armature of the regulator.

It is desired to maintain the voltage of the dynamo constant by varying the resistance $c$ in the field circuit $b$. The field coils $d$ and the armature winding $o$ of the regulator are connected across the voltage of the dynamo and together develop a turning-moment in the armature $g$. The armature is supported in bearings and is free to turn between the pole shoes of the magnet body $e$. It carries the bearing socket $h$ for the contact sector $k$ which rolls on the segments $i$ of the resistance $c$. When current flows through the field and armature windings, the motive system will turn against the force exerted by the springs $f$ and $f^1$ from the middle position shown in Fig. 1 in either direction according as to whether the voltage rises or falls. The main spring $f$ is a spiral fixed centrally to the rotating shaft of the motive system while the auxiliary spring $f^1$ is fastened to the lever $n$ through the link $m$. Since the torque exerted on the armature decreases as the angle turned through increases, the forces exerted by the springs $f$ and $f^1$ are so dimensioned that the torque on the armature alters in the same ratio so that a constant regulated voltage exists at the dynamo terminals. In order to obtain these conditions, the main spring $f$ is given a strongly increasing characteristic and the auxiliary spring $f^1$ a strongly falling one.

In Fig. 2, E represents the mechanical spring torque as a function of the travel of the regulator from one end position A to the other B. The curve E represents similarly the torque developed electrically. The opposing force of the main spring $f$ is shown as F. $F^1$ is the force exerted by the auxiliary spring $f^1$ which at the beginning either adds or subtracts its effect so balancing the turning moment of the armature.

Regulators according to the invention possessing a field coil and rotor winding connected in series one with another have the great advantage over regulators with unwound rotors in the respect that they are much more sensitive since not only is the torque greater but because an alteration of the force of the armature due to the current alteration in its winding occurs at the same time as an alteration of the field strength.

Claims:

1. In a regulator for a direct current generator, an armature connected to said generator, means for producing a magnetic field, said armature and field coacting to produce a torque varying in value with the angular position of said armature, a main spring arranged to oppose rotation of said armature, an auxiliary spring, and means for connecting said auxiliary spring to said armature to compensate the varying armature torque.

2. In a regulator for a direct current generator, means for producing a magnetic field, an armature rotatable in said field and connected to said generator, said armature and field coacting to produce a torque varying in value with the angular position of the armature, a main spring and an auxiliary spring arranged to oppose rotation of said armature and to compensate the varying armature torque, said main spring and said auxiliary spring having, respectively, a substantially increasing and a substantially decreasing characteristic.

3. In a regulator for a direct current generator, means for producing a magnetic field, an armature rotatable in said field and connected to said generator, a shaft for said armature, said armature and field coacting to produce a torque varying in value with the angular position of the armature, a main spring and an auxiliary spring arranged to oppose rotation of the armature and to compensate the varying armature torque, said main spring and said auxiliary spring having, respectively, a substantially increasing and a substantially decreasing characteristic, said main spring being centrally attached to the shaft, said auxiliary spring being arranged to act at a varying leverage on the shaft of the motive system.

In testimony whereof I have hereunto subscribed my name this 14th day of November, A. D. 1928.

HEINRICH GUETTINGER.